United States Patent [19]

Clikeman et al.

[11] 4,379,876
[45] Apr. 12, 1983

[54] METHYL METHACRYLATE-BUTADIENE-STYRENE IMPACT MODIFIER POLYMERS, POLYVINYL CHLORIDE, COMPOSITIONS AND METHODS

[75] Inventors: Richard R. Clikeman, Newtown, Pa.; Donald H. Jones, Vincentown, N.J.; Thomas J. Shortridge, Levittown; Edward J. Troy, Bristol, both of Pa.

[73] Assignee: Rohm and Haas Company, Philadelphia, Pa.

[21] Appl. No.: 167,510

[22] Filed: Jul. 11, 1980

[51] Int. Cl.³ .......................... C08K 5/05; C08K 5/13; C08F 220/14

[52] U.S. Cl. ..................................... 524/109; 524/140; 524/304; 524/312; 524/342; 524/343; 524/526

[58] Field of Search ....... 260/23 XA, 23 AR, 23.7 A, 260/23.7 M, 23.7 H, 18 PE, 18 PF, 45.85 S, 45.95 H, 29.6 RB, 29.7 UA, 45.9 SB, 45.9 B, 29.7 T; 525/227, 83; 524/109, 140, 304, 312, 342, 343, 526

[56] References Cited

U.S. PATENT DOCUMENTS

| | | | |
|---|---|---|---|
| 2,670,340 | 2/1954 | Kehe | 260/45.95 |
| 3,225,001 | 12/1965 | Darsa | 260/23 X A |
| 3,620,824 | 11/1971 | Slade et al. | 260/45.95 B |
| 3,644,249 | 2/1972 | Ide et al. | 260/23.7 M |
| 3,644,250 | 2/1972 | Ide et al. | 525/83 |
| 3,657,390 | 4/1972 | Tanaka et al. | 525/83 |
| 3,692,876 | 9/1972 | Ackermann et al. | 260/895 |
| 3,842,144 | 10/1974 | Tanaka et al. | 525/83 |
| 3,856,728 | 12/1974 | Abramoff | 260/45.95 B |
| 3,886,232 | 5/1975 | Tanaka et al. | 525/83 |
| 3,899,547 | 8/1975 | Amagi et al. | 260/23.7 M |
| 3,985,693 | 10/1976 | Lonning | 260/23 X A |
| 3,985,704 | 10/1976 | Jones et al. | 525/82 |
| 3,985,709 | 10/1976 | Saltman et al. | 260/47 |
| 4,035,443 | 7/1977 | Ide et al. | 260/23.7 M |
| 4,041,106 | 8/1977 | Ide et al. | 260/23 X A |
| 4,136,142 | 1/1979 | Hargreaves et al. | 260/45.95 B |

FOREIGN PATENT DOCUMENTS 1536399 12/1975 United Kingdom .

OTHER PUBLICATIONS

C. Abst. 27500v (93), 1980 Public., Sep. 15, 1978, Ioan, Florica et al., "Impact-resistant PVC Compositions", Rom. 63,892.
Chem. Abs. 90680m, vol. 89 (1978), "Butadiene-Methyl Methacrylate Styrene Graft Copolymer Comp. Having Good Heat and Light Stability", Arakawa 5-18-78.
Topanol CA Technical Bulletin 193 ICI, 655/MDFPG/13/R.
Chem. Abst., vol. 79-54397j, (1973), Heat Stable Impact Resistant Resin Comp.
Kureha, Chem. Ind. KK, 28.11.77-JA-142537 (Derwent Abstract 55313B/30).

Primary Examiner—John C. Bleutge
Assistant Examiner—Herbert J. Lilling
Attorney, Agent, or Firm—Jordan J. Driks

[57] ABSTRACT

Methyl methacrylate-butadiene-styrene polymer impact modifiers are improved by mixing them with about 0.01 to 5 percent by weight of a compound of the formula

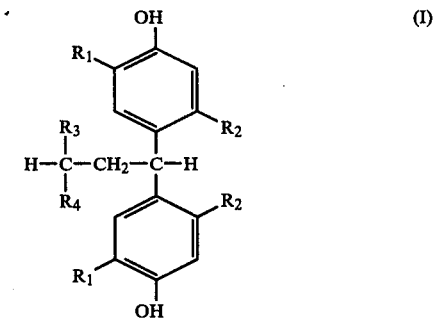

(I)

wherein $R_1$ and $R_2$ are $C_1$ to $C_4$ alkyl, $R_3$ and $R_4$ are H, $C_1$ to $C_4$ alkyl, or 4'-hydroxy-2'-$R_2$-5'-$R_1$-phenyl. Polyvinyl chloride (PVC) is mixed with the improved impact modifiers and has improved dispersion and resistance to discoloration.

7 Claims, No Drawings

METHYL METHACRYLATE-BUTADIENE-STYRENE IMPACT MODIFIER POLYMERS, POLYVINYL CHLORIDE, COMPOSITIONS AND METHODS

BACKGROUND OF THE INVENTION

1. FIELD OF THE INVENTION

This invention relates to the field of stabilization of MBS impact modifiers and PVC compositions containing such impact modifiers.

2. DESCRIPTION OF PRIOR ART

MBS modifiers have poor resistance to thermal oxidative degradation. This poor resistance may manifest itself most strongly during such procedures as isolation and oven drying. The least severe manifestation is slight discoloration, while dryer fires are an extreme, though not uncommon, consequence of failure to stabilize MBS modifiers.

Antioxidants are therefore incorporated into the MBS modifiers to reduce the risk of discoloration and fire during isolation and drying. The phenolic antioxidants exemplified by

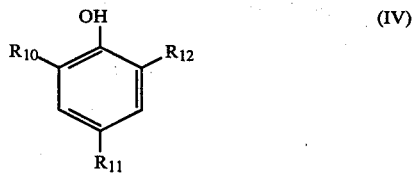

wherein $R_{10}$ and $R_{12}$ each represent hydrogen or a straight or branched $C_1$ to $C_4$ alkyl group, and $R_{11}$ represents hydrogen or a $C_1$ to $C_4$ straight or branched alkyl group or $-CH_2CH_2CO_2R_{13}$ where $R_{13}$ is a $C_8$ to $C_{20}$ straight or branched alkyl group, have been employed, particularly in concert with thiodipropionate synergists, to stabilize MBS modifiers. These systems are adequate in many respects, but are hampered by their tendency to develop colored impurities as a by-product of their antioxidant function. This production of colored impurities is particularly evident in the commercially important spray drying processes that utilize partially inerted atmospheres.

Belgain Patent 853,844 and Japanese Patent 142537 are illustrative.

SUMMARY OF THE INVENTION

It is an object of the invention to provide an MBS impact modifier which is resistant to yellowing under mild oxidative conditions.

It is a further object to provide MBS polymers which are exceptionally resistant to discoloration, especially in oxygen deficient environments, have superior resistance to scorch, and have significantly improved dispersibility in PVC.

These objects, and others as will become apparent from the following disclosure, are achieved by the present invention which in one aspect comprises a composition comprising a methyl methacrylate-butadiene-styrene polymer and about 0.01 to 5 percent by weight of a compound of the formula

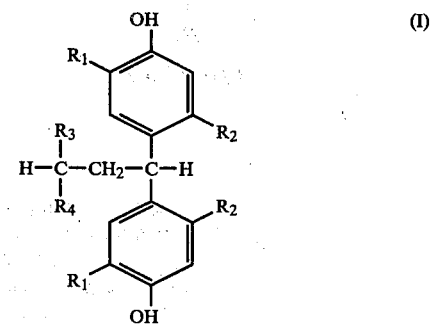

wherein $R_1$ and $R_2$ are $C_1$ to $C_4$ alkyl, $R_3$ and $R_4$ are H, $C_1$ to $C_4$ alkyl, or 4'-hydroxy-2'-$R_2$-5'-$R_1$-phenyl. In another aspect the invention comprises PVC containing about 1 to 30 percent by weight of the above-mentioned composition. In still another aspect, the invention comprises a method of stabilizing MBS polymer impact modifiers against thermal oxidative degradation and discoloration, and improving the dispersibility of said modifiers in PVC comprising blending an emulsion of a compound of formula I with an emulsion of the MBS polymer and isolating the resulting blend. The invention also comprises a method of modifying polyvinyl chloride comprising blending therewith about 1 to 30 percent by weight of the above-mentioned impact modifier composition.

DETAILED DESCRIPTION OF THE INVENTION AND PREFERRED EMBODIMENTS

MBS polymers are core-shell copolymers prepared in two or more stages where the core is about 90 to 50 parts of polybutadiene, or copolymers of butadiene with up to 50 percent styrene, lower alkyl acrylate, lower alkyl methacrylate, acrylonitrile, olefins, and the like, and the shell is about 10 to 50 parts of a lower alkyl methacrylate, especially methyl methacrylate, lower alkyl acrylate, styrene and/or acrylonitrile, with optional crosslinking and/or graftlinking monomers. The MBS polymer can also have the relationship of the core to the shell reversed.

Examples of suitable compounds of formula I are 1,1,3-tris(2-methyl-4-hydroxy-5-tert-butyl phenyl) butane, sold under the trademark Topanol CA, and 4,4'-butylidenebis (6-t-butyl-m-cresol) sold under the trademark Santowhite Powder. The first, Topanol CA, is preferred.

In addition to the compound of formula I, preferably about 0.01 to 15 percent by weight of a compound of the formula

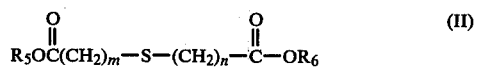

wherein m and n are integers from 1 to 4, and $R_5$ and $R_6$ are $C_8$ to $C_{20}$ alkyl can also be included. Examples of compounds of formula II are dicapryl, dilauryl, dipalmityl, and distearyl thiodipropionates. In addition, a phosphorous compound of the formula

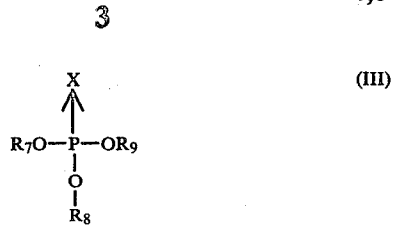

wherein X is oxygen or a lone electron pair and $R_7$, $R_8$, $R_9$ are H, $C_1$ to $C_{20}$ alkyl, or mono- or di-$C_1$ to $C_{20}$ alkyl substituted phenyl can also be included, preferably about 0.01 to 15 percent by weight. Examples of such phosphorous compounds are phosphoric acid and tris(-nonyl phenyl) phosphite.

Also, optionally up to 5 percent by weight epoxidized or unepoxidized vegetable oil can be included in the MBS modifier composition.

The MBS compositions of the invention can be prepared by mixing emulsions of the MBS impact modifier polymer and the compound of formula I, with optional additional ingredients such as compounds of formulae II, III, and the vegetable oil incorporated in the emulsion of the compound of formula I; and then isolated as a powder by conventional spray drying or coagulation methods.

The isolated powder composition is melt blended with PVC in a ratio of 97 to 70 parts PVC to about 3 to 30 parts of the impact modifier composition.

In the following examples, all parts and percentages are by weight based on modifier, unless otherwise indicated.

EXAMPLE 1

To an MBS impact modifier emulsion synthesized in accordance with Example 1 of U.S. Pat. No. 3,985,704 maintained at 65° C. was added 0.34% 1,1,3-tris(2-methyl-4-hydroxy-5-tert-butyl phenyl)butane and 1.02% dilauryl thiodiproprionate as a stabilizer system, along with other ingredients as set forth in detail in Table 1. The resultant stabilized emulsion was maintained at 65° C. for 30 minutes, then isolated by spray drying following the procedure of the above-mentioned patent.

The long term stability of the resultant MBS impact modifier powder was measured by an accelerated test which comprised placing 5 grams of MBS modifier powder in an aluminum pan having a 2-inch diameter and ⅛ inch side height. The pan is placed in a 320° F. forced air oven and removed when it begins to scorch, where scorch is defined as the point at which the powder begins to burn. Scorch time is the elapsed time from placement of sample in the preheated 320° F. oven to scorch.

The scorch time is reported in Table II. The fact that the scorch resistance was so high means that the long term stability of this polymer would be high.

EXAMPLE 2

Example 1 was repeated, except using a slightly different MBS polymer which was a two stage polymer containing butadiene, styrene, methyl methacrylate, and divinyl benzene, and was isolated by coagulation; and using only 0.40% of the stabilizer system set forth in Example 1.

EXAMPLE 3

Example 1 was repeated except using polymer which is a two stage polymer containing butadiene, styrene, methyl methacrylate, and ethyl acrylate; and 1.05% of the stabilizer system.

EXAMPLE 4

Example 1 was repeated except using a two stage polymer of butadiene styrene, methyl methacrylate and butyl acrylate isolated by coagulation; and 2.125% of the stabilizer system.

EXAMPLE 5

Example 1 was repeated except using stabilizer system B.

EXAMPLE 6 (Comparative)

Example 1 was repeated except using stabilizer system E.

EXAMPLE 7 (Comparative)

Example 2 was repeated except using stabilizer system F.

EXAMPLE 8 (Comparative)

Example 3 was repeated except using stabilizer system D.

EXAMPLE 9 (Comparative)

Example 4 was repeated except using stabilizer system C.

EXAMPLE 10 (Comparative)

Example 4 was repeated except no stabilizer system was used.

The results of the scorch tests of Examples 1–10 are reported in Table 2.

TABLE I

| Stabilizer Emulsion Compositions: Parts by Weight | | | | | | |
|---|---|---|---|---|---|---|
| Ingredients | (A) | (B) | (C) | (D) | (E) | (F) |
| dilauryl thiodipropionate | 69.6 | 2.054 | — | — | — | 48.0 |
| 1,1,3-tris (2-methyl-4-hydroxy-5-tert-butyl phenyl) butane[a] | 23.2 | 0.684 | — | — | — | — |
| oleic acid | 9.3 | 0.274 | 10.0 | 6.9 | 8.7 | 6.4 |
| 0.5 normal sodium hydroxide | 66.1 | 1.951 | — | — | — | 45.6 |
| deionized water | 63.3 | 1.883 | 50.0 | 152.2 | 102.1 | 44.0 |
| soybean oil | — | 6.846 | — | — | 37.0 | — |
| n-octadecyl-3,5-di-tert-butyl-4-hydroxyhydrocinnanate[b] | — | — | 57.0 | — | — | 16.0 |
| 4,4'-thiobis (6-tert-butyl-m-cresol)[c] | — | — | 14.3 | — | — | — |
| tris-nonylated-phenyl phosphite[d] | — | — | 28.7 | — | — | — |
| 85% potassium hydroxide | — | — | 2.3 | 1.7 | 22 | — |
| 2,6-di-tert-butyl-p-cresol[e] | — | — | — | 39.1 | 50 | — |

Trademarks
[a] = Topanol CA
[b] = Irganox 1076
[c] = Santonox R
[d] = Naugard PHR
[e] = Ionol

TABLE II

| MBS Modifier Powder Scorch Times at 320° F. | | | |
|---|---|---|---|
| Example | Stabilizer Emulsion | Weight % Total Antioxidants On Modifier | Minutes to Scorch | Invention (I) or Comparative (C) |
| 1 | (A) | 1.36 | 300 | I |
| 5 | (B) | 1.36 | 210 | I |
| 6 | (E) | 1.36 | 30 | C |
| 2 | (A) | 0.40 | 380 | I |

TABLE II-continued

MBS Modifier Powder Scorch Times at 320° F.

| Example | Stabilizer Emulsion | Weight % Total Antioxidants On Modifier | Minutes to Scorch | Invention (I) or Comparative (C) |
|---|---|---|---|---|
| 7 | (F) | 0.40 | 165 | C |
| 3 | (A) | 1.05 | greater than 780* | I |
| 8 | (D) | 1.05 | 75 | C |
| 4 | (A) | 2.125 | greater than 780* | I |
| 9 | (C) | 2.125 | 655 | C |
| 10 | None | 0.00 | 15 | C |

*Test stopped at 780

EXAMPLE 11

Color Development During Accelerated Stability Test of Press MBS Modifier Plaque This accelerated stability test is designed to monitor the rate of color development in MBS modifiers (stabilized and unstabilized) under heat aging conditions in an oxygen deficient environment. In plaque form, the MBS modifier is much less accessible to oxygen than as a powder such that mild oxidative discoloration can be conveniently monitored at 340° F. in the practical time frame of five hours or less. To assure homogeneous distribution of stabilizer within the MBS modifier plaque, the powder is usually fluxed briefly on a rolling mill bank, or in a Watson-Stillman extruder, prior to pressing.

Sixty grams of the MBS Modifier of Example 2, stabilized with stabilizer A at the 0.40 weight percent antioxidants on modifier level in accordance with Example I, are milled for 1.0 minute after flux at 325° F. on a 3-inch diameter, 7-inch wide roll. A ten gram sample of milled sheet is positioned between two Mylar ® sheets and pressed into a clear, colorless 6-inch diameter, 0.023 inch thick plaque at 350° F. and 30 tons per square inch pressure using a cycle employing 3 minute preheat, 2 minute press with heat, 3 minute press with cooling.

The Mylar ® sheets are removed, and the plaque is cut into 1 inch×0.5 inch rectangles which are placed on a Mylar ® sheet in a 340° F. forced air oven. A rectangle is removed periodically and rated for color development using a Hellige-Comparator designed for the 620C-42 color system of the Institute of Paint and Varnish Research. The sample is suspended in one cell of the instrument and compared with a standard color disc in the other cell. A designation of 1 denotes a nearly colorless sample, and standards become increasingly yellow and finally brown as the highest rating of 18 is approached. The rating system is accurate to approximately 0.5 unit.

The results for this stabilizer A system of the invention are listed in Table 3 along with results for the analogous stabilizer F (comparative) system and an unstabilized modifier control. Initial and 3.0 hours VCS color ratings are given, and the 320° F. powder scorch values first listed in Table II are repeated for comparative purposes. The surprising and important result of Table III is that the MBS modifier stabilized with a system containing a prior art Formula (IV) antioxidant yellows more rapidly in the mildly oxidative environment of the plaque than does the same modifier containing zero stabilizer. The effect occurs in spite of the fact that the unstabilized parent powder scorches eleven times faster than its counterpart stabilized with stabilizer F.

In sharp contrast, the stabilizer A system discolors much more slowly than the unstabilized modifier. It is clear that: MBS modifier systems containing Formula IV stabilizers in accordance with the prior art generate undesirable colored by-products upon mild oxidation; the intensity of color produced by these is in excess of that generated in the absence of stabilizer; and MBS modifier systems containing Formula (I) stabilizers in accordance with the invention suppress rather than enhance color formation relative to unstabilized modifier under mild oxidative conditions.

TABLE III

Pressed MBS Modifier Color Development at 340° F.

| MBS Modifier | Stabilizer Emulsion | Phenolic Antioxidant Type | Weight % Total Antioxidants On Modifier | VSC Color Rating 0.0 Hours | VSC Color Rating 3.0 Hours | Minutes to Powder Scorch at 320°F. |
|---|---|---|---|---|---|---|
| 2 | (A) | Formula (I) | 0.40 | 1 | 2.5 | 380 |
|  | (F) | Formula (IV) | 0.40 | 1 | 6.5 | 165 |
|  | None | — | 0.00 | 1 | 4.5 | 15 |

EXAMPLE 12

Early Color Test by Extrusion of MBS/PVC Blend

The early color test is a measure of the sensitivity of a blue pigmented polyvinyl chloride masterbatch blend with an MBS modifier to green color development upon extrusion. All other variables constant, this green color development in extruder bars is taken as reflective of the contribution to yellowing afforded by a given MBS modifier/antioxidant system in an oxygen poor environment under stress at elevated temperature.

Thirty-two-and-one-half grams of the MBS Modifier of Example 2, stabilized with Stabilizer (A) at the 0.40 weight percent antioxidants on modifier level are blended with 250 grams blue pigmented PVC masterbatch for 30 seconds at high speed in a Waring Blender. The resultant blend is extruded at 3600 meter-grams torque down four zones maintained in sequence at 179°, 180°, 186°, and 188° C. through a 0.2×⅜ inch capillary die to produce a blue bar, a 5-inch segment of which is cut and evaluated for color development.

The MBS Modifier/stabilizer (F)/PVC analog is identically extruded as is the unstabilized Modifier/PVC control. The Modifier/stabilizer (F)/PVC bar was ranked equal to the control (having unstabilized MBS component), while the MBS Modifier/stabilizer (A)/PVC bar was ranked bluer (less yellowing leading to greenish cast) than the others. The MBS Modifier/stabilizer/PVC system containing the Formula (I) stabilizer of the invention produced less coloration than that using the Formula (IV) stabilizer of the prior art.

EXAMPLE 13

Dispersion Test by Extrusion of MBS/PVC Blend

The dispersion test measures the efficiency with which the MBS modifier disperses into the continuous polyvinyl chloride phase upon fluxing and working in an extruder under carefully controlled conditions. An MBS/PVC blend is extruded into a strip of 0.020 inch thick and 1.25 inch wide. Under test conditions, an MBS modifier that disperses well yields a clear strip with few gel-like imperfections, while a poorly dispersing modifier yields a strip marred by many such imperfections. Changes in MBS modifier dispersibility in PVC as a function of stabilizer identity and quantity are measured by this dispersion test.

Twenty grams of the MBS Modifier of Example 4, stabilized with Stabilizer(A) at the 0.85 weight percent antioxidants on modifier level and 207 grams of PVC compound are hand blended or blended for 30 seconds at high speed in a Waring Blender. The powder blend is extruded into a continuous sheet using a Haake Rheocord Torque Rheometer Model EU-5 fitted with a Haake Rheomix 252 extruder. The Rheomix extruder has an 0.75 inch barrel, a single stage 24/1:L/D screw and a 2-inch×0.093 inch slit die. The extruder is run at 20 rpm at zone temperatures of Z1=185° C., Z2=176° C., Z3=181° C., and Z4=195° C. The polymer extrusion rate is 18-19 grams/minute.

The extruded sheet is rated for the amount of undispersed modifier particles using a Biotran II Colony Counter supplied by New Brunswick Scientific Company. This instrument is designed to count bacterial colonies but has been modified to count the gel particle density in the extruded sheets. The modifications include an auxilliary TV camera and a 75 mm telephoto lens with a 14 mm extender. The Biotran Colony Counter counts the number of gel particles in a 500 square millimeter area. The particle lower limit to gel size detection is 0.1 mm diameter. Ten measurements are taken and the average value is recorded as the dispersion number counts.

Table IV lists the dispersion counts for the extruded strip of this example along with those for Example 4 Modifier/stabilizer (A) systems at total antioxidant on modifier levels of 1.313 and 2.125 weight percent. Results for

TABLE IV

| Dispersion in PVC Measured by Biotran II Colony Counter | | | |
|---|---|---|---|
| | Wt. % Total Antioxidant on Modifier (4) | | |
| Stabilizer | 2.125 | 1.313 | 0.85 |
| (A) | 70 | 150 | 242 |
| (F) | 360 | 360 | 630 |
| (C) | 240 | 480 | 420 | analogous systems employing stabilizers (C) and (F) are also listed. Table IV contains direct counts of gels per unit area, i.e., lower counts represent more desirable dispersion.

The data shows that dispersion improves with increasing weights of stabilizer (A) containing Formula (I) antioxidant according to the invention. Furthermore, the dispersion with stabilizer (A) is much better than that for the prior art stabilizers (C) and (F) having Formula (IV) antioxidants.

While the invention has been described and exemplified in great detail, various modifications, alterative embodiments, alterations, and improvements should become apparent without departure from the spirit and scope of the invention.

We claim:

1. Impact modifier composition comprising a methyl methacrylate-butadiene-styrene polymer prepared in two or more stages and containing about 50 to 90 parts polybutadiene or compolymer of polybutadiene and about 0.01 to 5 percent by weight of 1,1,3-tris (2-methyl-4-hydroxy-5-tert-butyl phenyl) butane.

2. Composition of claim 1 further including 0.01 to 15 percent by weight of a compound of the formula

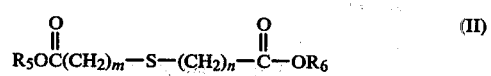

wherein m and n are integers from 1 to 4, and $R_5$ and $R_6$ are $C_8$ to $C_{20}$ alkyl.

3. Composition of claim 1 further including 0.01 to 15 percent by weight of a compound of the formula

wherein X is oxygen or a lone electron pair and $R_7$, $R_8$, $R_9$ are H, C1 to C20 alkyl, or mono- or di- $C_1$ to $C_{20}$ alkyl substituted phenyl.

4. Composition of claim 1 further including about 0.1 to 5 percent by weight vegetable oil or epoxidized vegetable oil.

5. Discoloration resistant composition of improved dispersion comprising polyvinyl chloride and about 1 to 30 percent by weight of an impact modifier composition according to claims 1, 2, 3 or 4.

6. Method of stabilizing methyl methacrylate-butadiene-styrene polymer impact modifiers containing about 50 to 90 parts polybutadiene or copolymer of polybutadiene against oxidative degradation and discoloration, and improving the dispersibility of said modifiers in polyvinyl chloride comprising blending an emulsion containing 1,1,3-tris (2-methyl-4-hydroxy-5-tert-butyl phenyl) butane with an emulsion of the polymer impact modifier, and isolating the resultant blend.

7. Method of impact modifying polyvinyl chloride comprising blending therewith about 1 to 30 percent by weight of an impact modifier composition according to claims 1, 2, 3 or 4.

* * * * *

UNITED STATES PATENT AND TRADEMARK OFFICE
CERTIFICATE OF CORRECTION

PATENT NO. : 4,379,876

DATED : April 12, 1983

INVENTOR(S) : Richard R. Clikeman et al.

It is certified that error appears in the above-identified patent and that said Letters Patent is hereby corrected as shown below:

Column 3, line 48, "1/8" should read -- 5/8 --.

Signed and Sealed this

Twenty-seventh Day of March 1984

[SEAL]

*Attest:*

GERALD J. MOSSINGHOFF

*Attesting Officer*  *Commissioner of Patents and Trademarks*